United States Patent
Lin

(10) Patent No.: US 12,188,771 B2
(45) Date of Patent: Jan. 7, 2025

(54) INERTIAL MEASUREMENT UNIT EVALUATING METHOD AND SYSTEM THEREOF

(71) Applicant: Universal Global Technology (Kunshan) Co., Ltd., Jiangsu Province (CN)

(72) Inventor: Cheng-Lung Lin, Jiangsu Province (CN)

(73) Assignee: Universal Global Technology (Kunshan) Co., Ltd., Jiangsu Province (CN)

( * ) Notice: Subject to any disclaimer, the term of this patent is extended or adjusted under 35 U.S.C. 154(b) by 30 days.

(21) Appl. No.: 18/366,693

(22) Filed: Aug. 8, 2023

(65) Prior Publication Data

US 2024/0328788 A1 Oct. 3, 2024

(30) Foreign Application Priority Data

Mar. 31, 2023 (CN) .......................... 202310334142.0

(51) Int. Cl.
*G01C 21/16* (2006.01)
*G06V 20/58* (2022.01)

(52) U.S. Cl.
CPC .......... *G01C 21/1656* (2020.08); *G06V 20/58* (2022.01)

(58) Field of Classification Search
CPC ............................ G01C 21/1656; G06V 20/58
See application file for complete search history.

(56) References Cited

U.S. PATENT DOCUMENTS

| | | | |
|---|---|---|---|
| 2019/0034740 A1* | 1/2019 | Kwant | G06V 10/462 |
| 2020/0134326 A1* | 4/2020 | Boev | B60W 40/072 |
| 2020/0410255 A1* | 12/2020 | Guo | G06N 3/045 |
| 2021/0248392 A1* | 8/2021 | Zaheer | G06N 3/08 |

FOREIGN PATENT DOCUMENTS

CN 111422175 A 7/2020

* cited by examiner

*Primary Examiner* — Mishawn N. Hunter
(74) *Attorney, Agent, or Firm* — CKC & Partners Co., LLC

(57) ABSTRACT

An inertial measurement unit evaluating method is for evaluating an accuracy of an inertial measurement unit included in an autonomous driving vehicle. The inertial measurement unit evaluating method includes an image capturing step, a vanishing line calculating step, an image parameter determining step, a unit parameter obtaining step and a parameter comparing step. The left image includes a first left lane line, a first right lane line and a first vanishing point, and the right image includes a second left lane line, a second right lane line and a second vanishing point. The vanishing line calculating step includes calculating to generate a vanishing line equation of a vanishing line, which is a line connecting the first vanishing point and the second vanishing point. The parameter comparing step includes comparing the image parameter set and the unit parameter set to generate a comparison result.

10 Claims, 14 Drawing Sheets

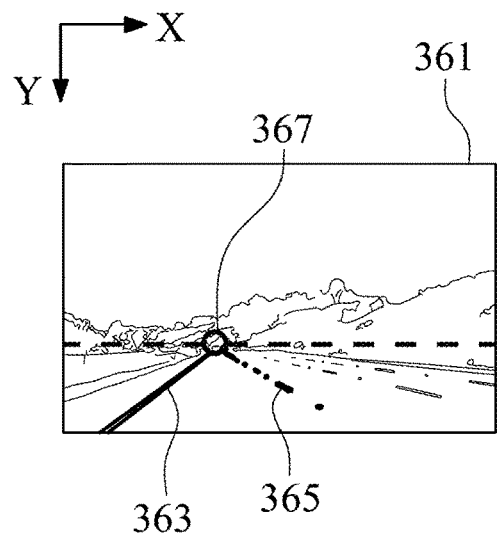
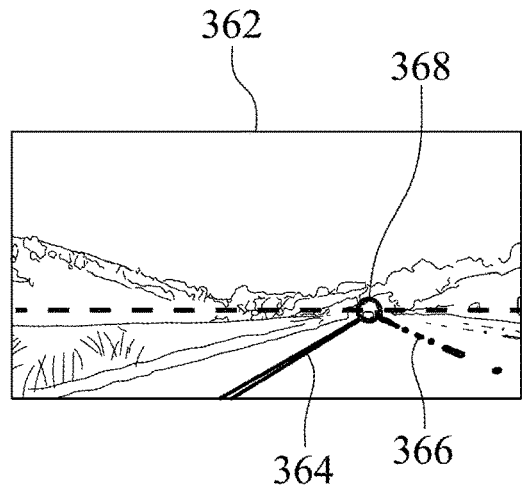
Fig. 6A          Fig. 6B
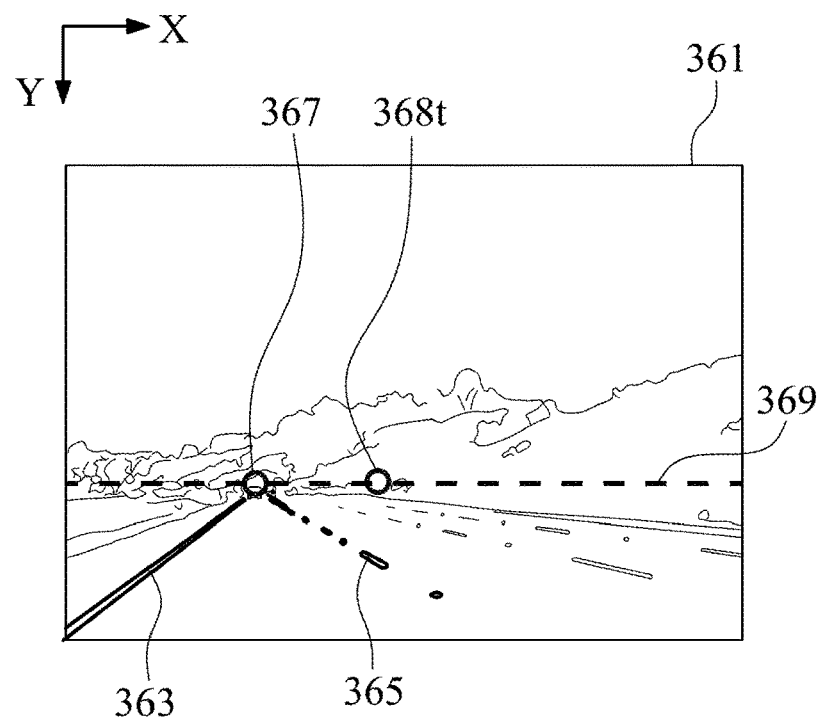
Fig. 6C

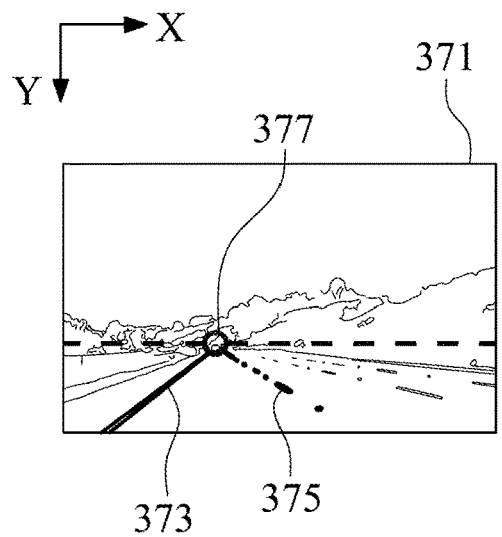 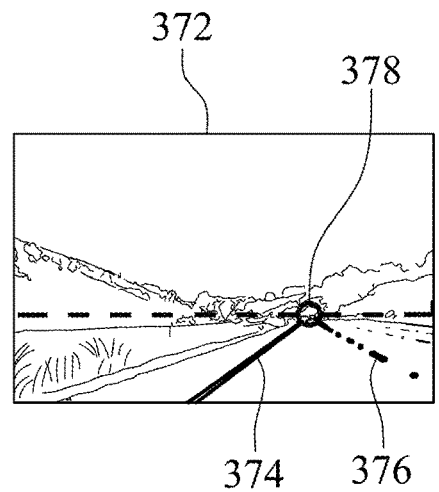
Fig. 7A    Fig. 7B
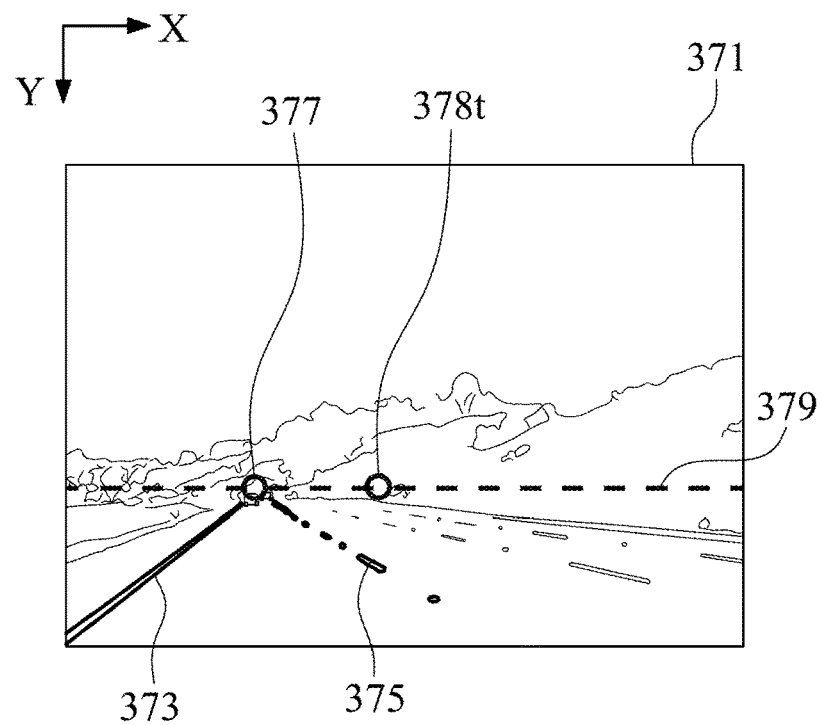
Fig. 7C

INERTIAL MEASUREMENT UNIT EVALUATING METHOD AND SYSTEM THEREOF

RELATED APPLICATIONS

This application claims priority to China Application Serial Number 202310334142.0, filed Mar. 31, 2023, which is herein incorporated by reference.

BACKGROUND

Technical Field

The present disclosure relates to an inertial measurement unit evaluating method and a system thereof. More particularly, the present disclosure relates to an inertial measurement unit evaluating method and a system thereof applied to autonomous driving vehicles.

Description of Related Art

When the autonomous driving vehicle is positioned under the high-precision map, the multipath effects of the Global Navigation Satellite System (GNSS) or non-line-of-sight propagation (NLOS) will cause errors and cannot be corrected. While driving in an urban area with dense shelters, the buildings in the city will block satellite signals in large areas. The magnitude and direction of the errors are affected by the geometric relationships between obstacles and signals, and the path delay errors resulted therefrom can reach tens of meters, so it is necessary to cooperate with an inertial measurement unit (IMU) to assist the inertial navigation.

The inertial measurement unit usually includes a gyroscope and an acceleration sensor, and the accuracy is the most important performance index. The errors of the inertial measurement unit include the error of the gyroscope itself and the drift error. The drift error is the interference caused by the external noise, vibration, and temperature gradient of the gyroscope, so the actual error will far exceed the error indicated in the specification. Hence, the inertial measurement unit must be calibrated before using. The conventional calibration method must include complex and modified mathematical calculations such as a filter, or a high price and high precision inertial measurement unit must be used.

Given the above, there is an urgent need in the market for a method and system that are beneficial to the accuracy of the inertial measurement unit, and can effectively reduce the amounts of calculation and cost in the same time.

SUMMARY

According to one aspect of the present disclosure, an inertial measurement unit evaluating method is for evaluating an accuracy of an inertial measurement unit included in an autonomous driving vehicle. The autonomous driving vehicle further includes a left camera and a right camera, and the left camera and the right camera both face a front direction of the autonomous driving vehicle. The inertial measurement unit evaluating method includes an image capturing step, a vanishing line calculating step, an image parameter determining step, a unit parameter obtaining step and a parameter comparing step. The image capturing step includes capturing a left image and a right image by the left camera and the right camera, respectively, at a time point, the left image includes a first left lane line, a first right lane line and a first vanishing point, the first vanishing point is an intersection (point) of the first left lane line and the first right lane line, the right image includes a second left lane line, a second right lane line and a second vanishing point, and the second vanishing point is an intersection of the second left lane line and the second right lane line. The vanishing line calculating step includes calculating to generate a vanishing line equation of a vanishing line, which is a line connecting the first vanishing point and the second vanishing point. The image parameter determining step includes determining an image parameter set of the autonomous driving vehicle according to the vanishing line equation. The unit parameter obtaining step includes obtaining a unit parameter set of the autonomous driving vehicle from the inertial measurement unit. The parameter comparing step includes comparing the image parameter set and the unit parameter set to generate a comparison result.

According to another aspect of the present disclosure, an inertial measurement unit evaluating system is disposed on an autonomous driving vehicle and includes an inertial measurement unit, a left camera, a right camera, a storage medium and a processor. The left camera faces a front direction of the autonomous driving vehicle, and the right camera faces the front direction. The storage medium is configured to provide an inertial measurement unit evaluating program. The processor is communicatively coupled to the inertial measurement unit, the left camera, the right camera and the storage medium. Based on the inertial measurement unit evaluating program, the processor is configured to: capture a left image and a right image by the left camera and the right camera, respectively, at a time point, wherein the left image includes a first left lane line, a first right lane line and a first vanishing point, the first vanishing point is an intersection of the first left lane line and the first right lane line, the right image includes a second left lane line, a second right lane line and a second vanishing point, and the second vanishing point is an intersection of the second left lane line and the second right lane line; calculate to generate a vanishing line, which is a line connecting the first vanishing point and the second vanishing point; determine an image parameter set of the autonomous driving vehicle according to the vanishing line; obtain a unit parameter set of the autonomous driving vehicle from the inertial measurement unit; and compare the image parameter set and the unit parameter set to generate a comparison result.

BRIEF DESCRIPTION OF THE DRAWINGS

The present disclosure can be more fully understood by reading the following detailed description of the embodiment, with reference made to the accompanying drawings as follows:

FIG. 6A and FIG. 6B are schematic views of the vanishing points of the left image and the right image, respectively, of the reference line for determining the image up-down tilt angle in the inertial measurement unit evaluating method of the 1st embodiment.

FIG. 6C is a schematic view of the reference line for determining the image up-down tilt angle in the inertial measurement unit evaluating method of the 1st embodiment.

FIG. 7A and FIG. 7B are schematic views of the vanishing points of the left image and the right image, respectively, of the reference line for determining the image left-right tilt angle in the inertial measurement unit evaluating method of the 1 st embodiment.

FIG. 7C is a schematic view of the reference line for determining the image left-right tilt angle in the inertial measurement unit evaluating method of the 1st embodiment.

DETAILED DESCRIPTION

Figure 1:
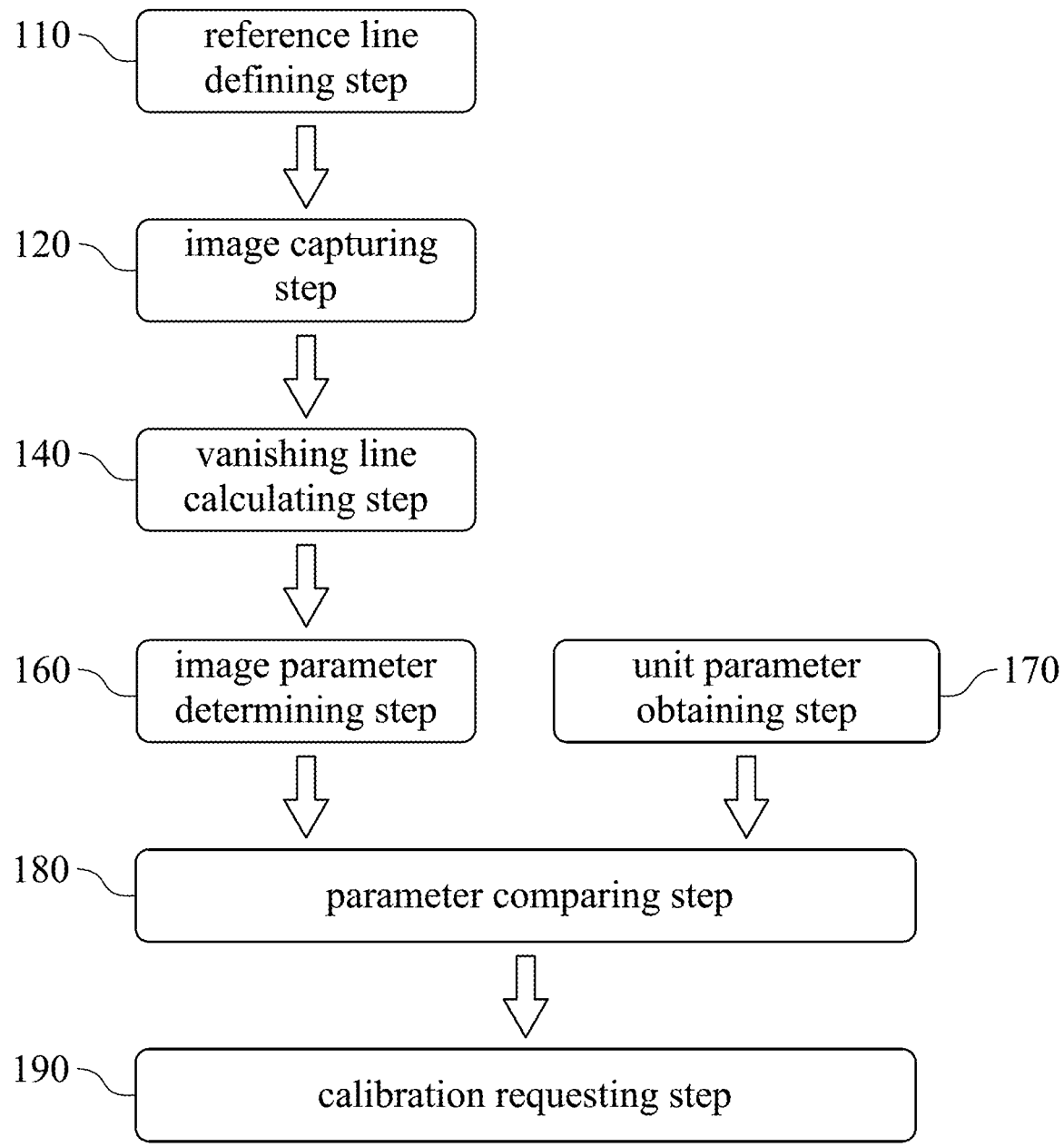
FIG. 1 is a flow chart of an inertial measurement unit evaluating method according to the 1 st embodiment of the present disclosure.
Figure 2A:
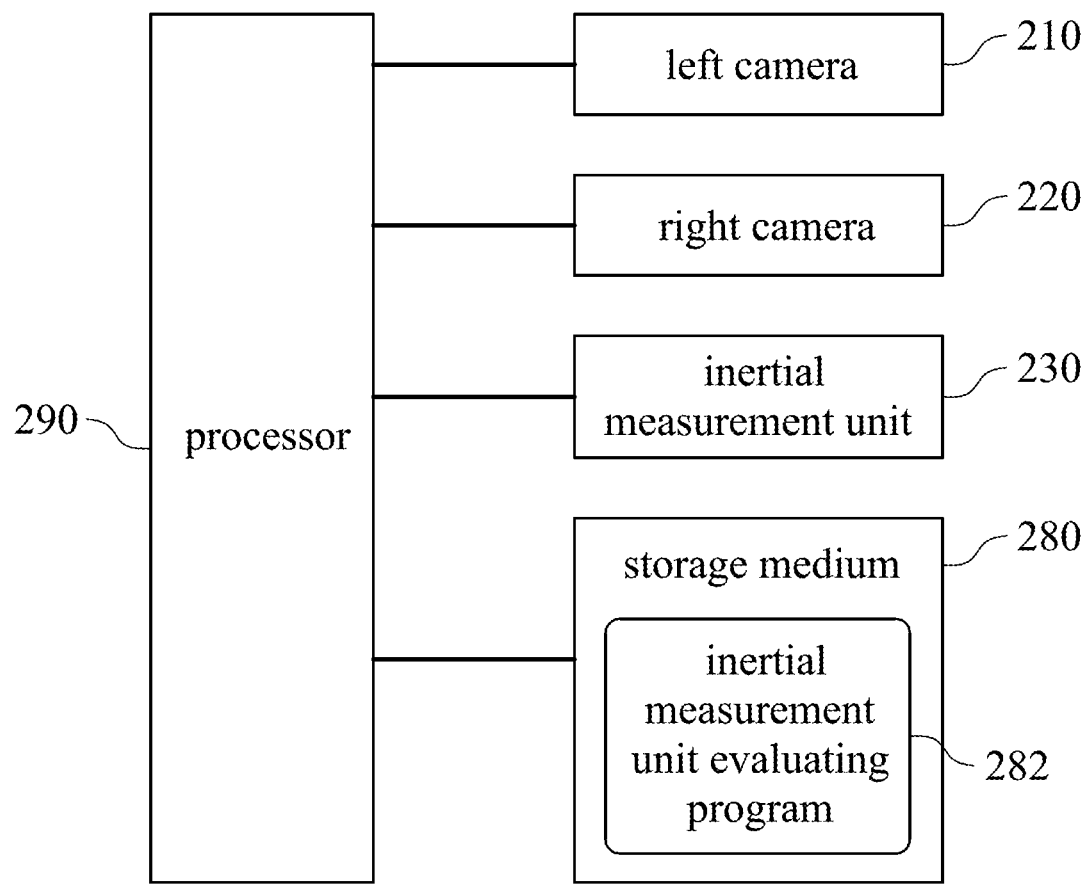
FIG. 2A is a block diagram of an inertial measurement unit evaluating system according to the 2nd embodiment of the present disclosure.
Figure 2B:
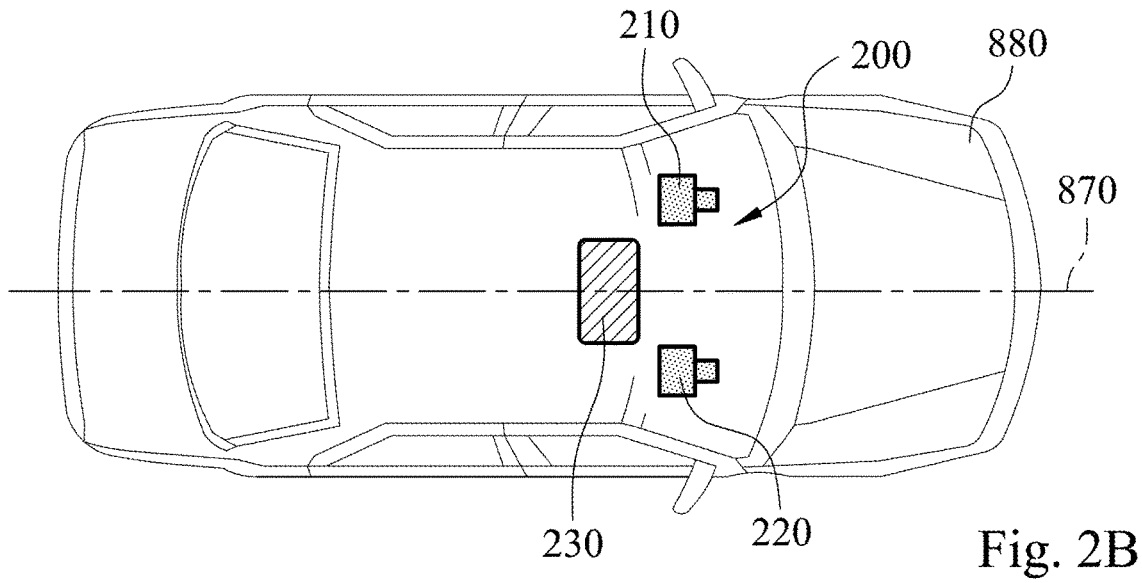
FIG. 2B, FIG. 2C and FIG. 2D are a top schematic view, a side schematic view and a front schematic view, respectively, of an autonomous driving vehicle including the inertial measurement unit evaluating system in FIG. 2A.
Figure 2C:
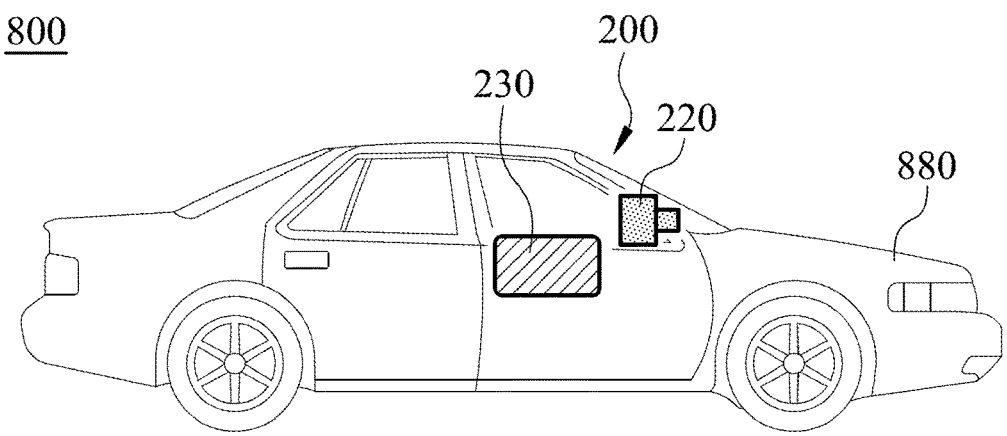
Figure 2D:
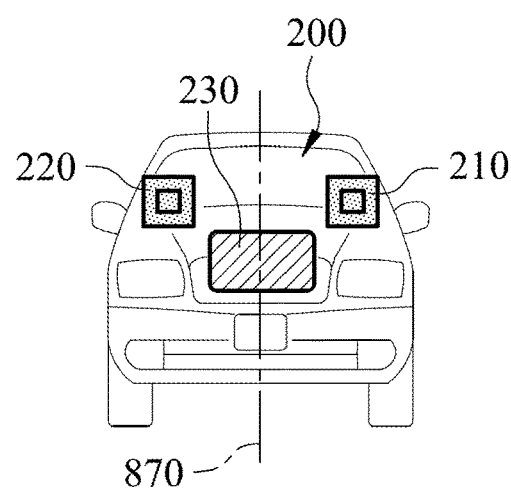
Figure 3A:
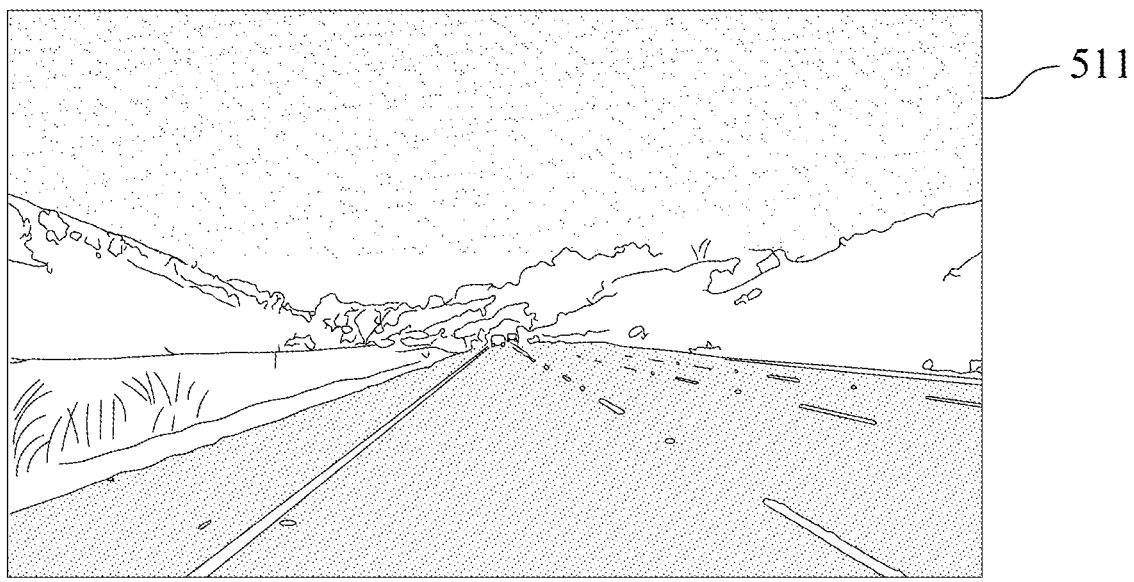
FIG. 3A, FIG. 3B, FIG. 3C, FIG. 3D, FIG. 3E and FIG. 3F are schematic views of the images corresponding to the sub-steps of the image capturing step in FIG. 1.
Figure 3B:
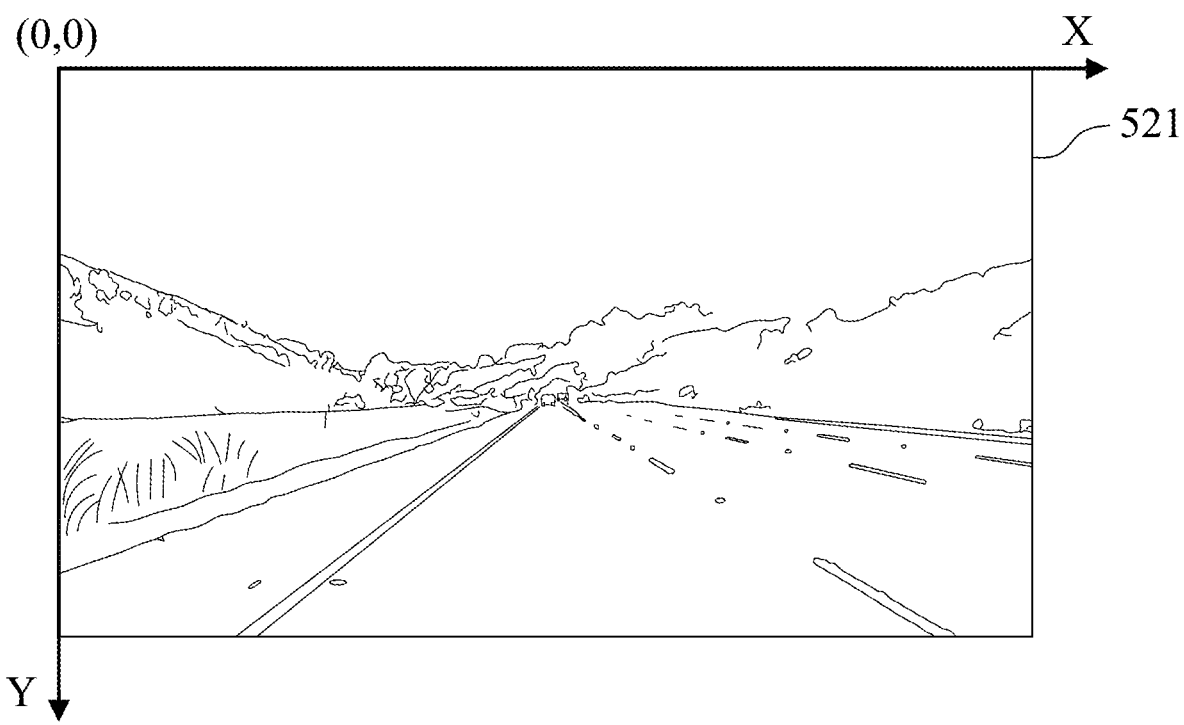
Figure 3C:
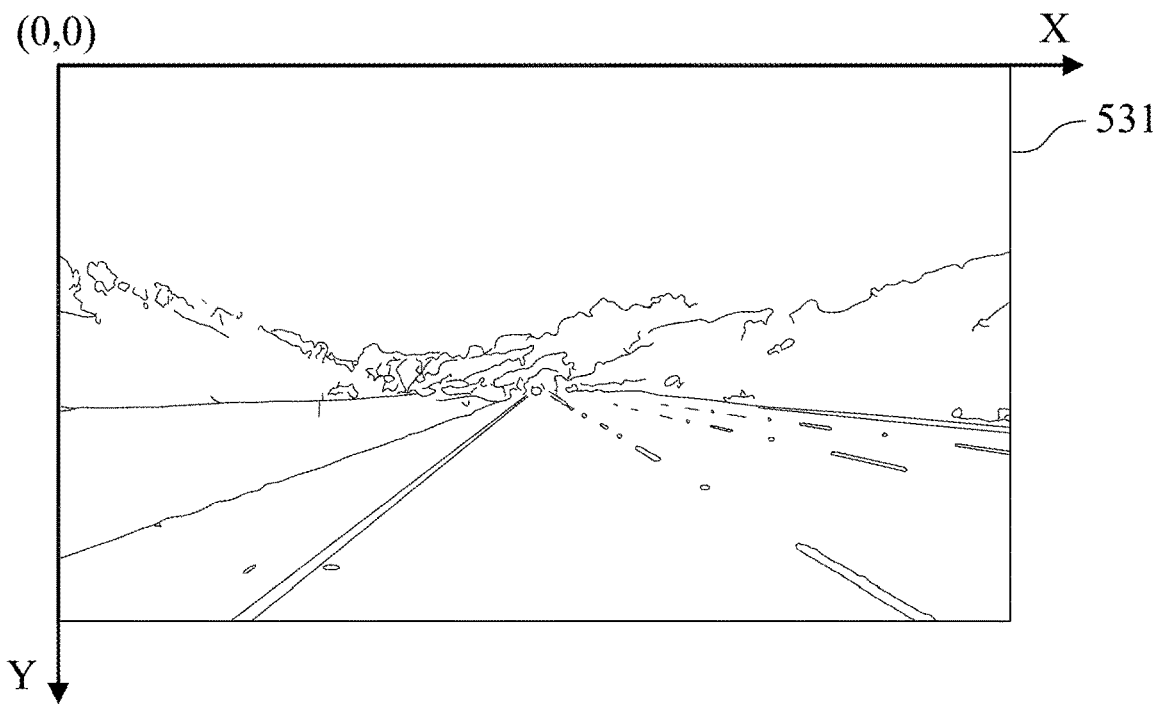
Figure 3D:
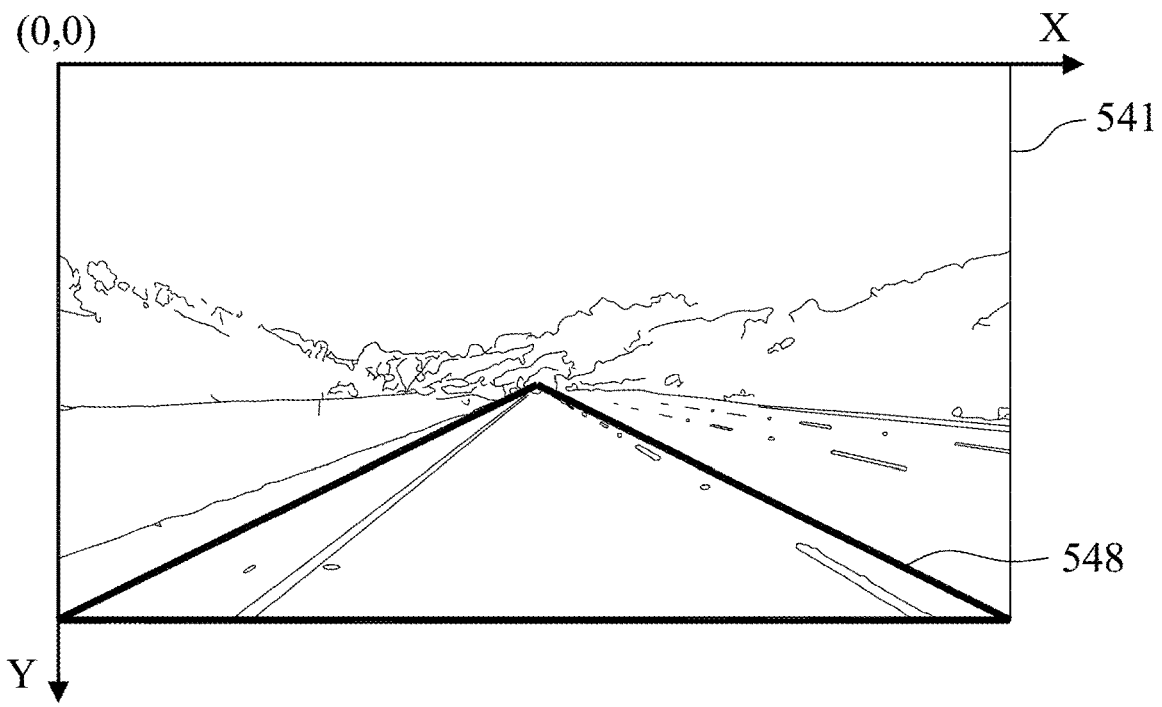
Figure 3E:
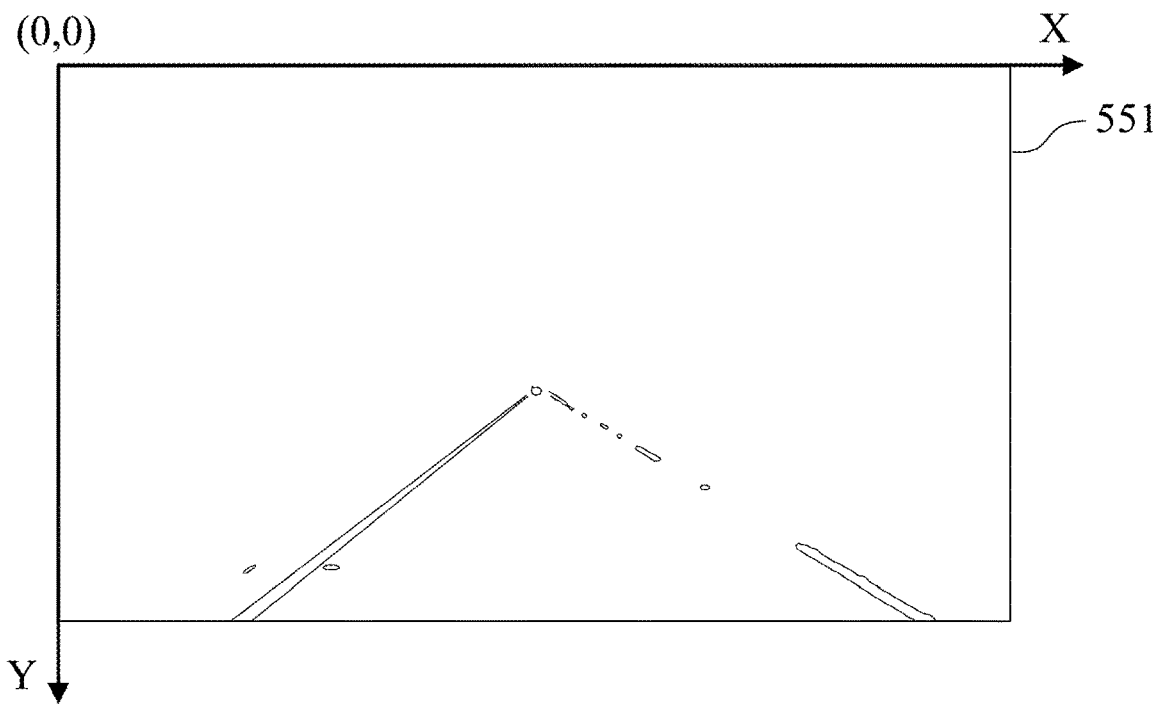
Figure 3F:
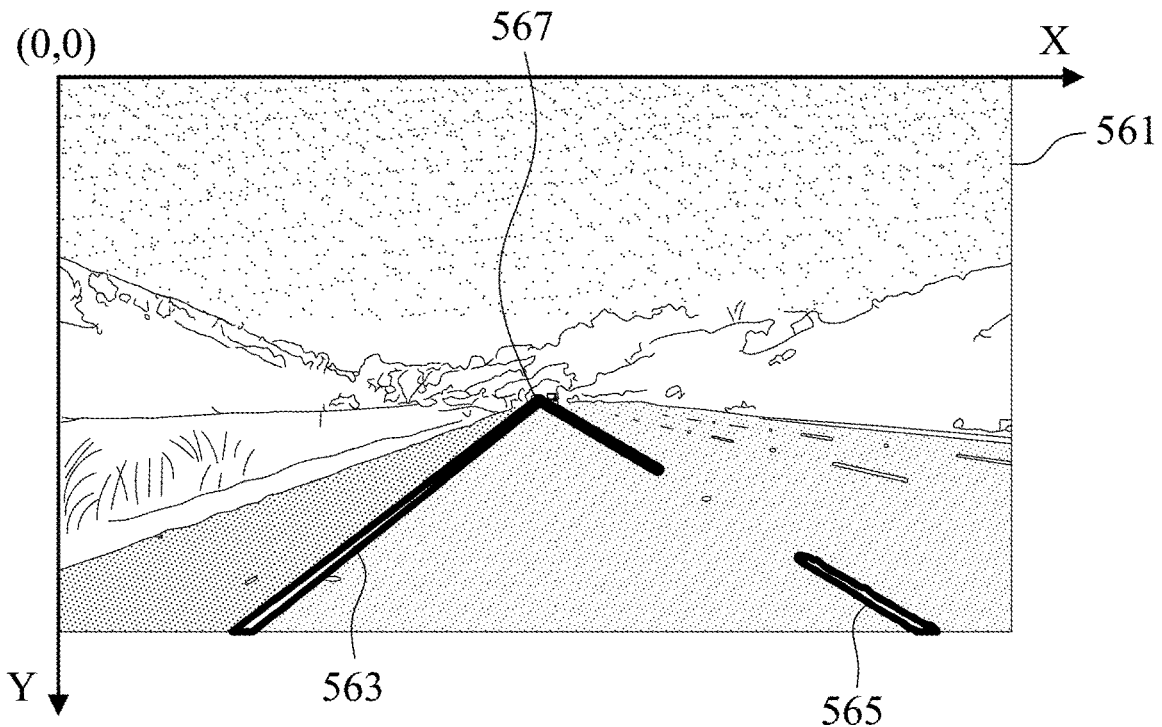

FIG. 1 is a flow chart of an inertial measurement unit evaluating method 100 according to the 1st embodiment of the present disclosure. FIG. 2A is a block diagram of an inertial measurement unit evaluating system 200 according to the 2nd embodiment of the present disclosure. FIG. 2B, FIG. 2C and FIG. 2D are a top schematic view, a side schematic view and a front schematic view, respectively, of an autonomous driving vehicle 800 including the inertial measurement unit evaluating system 200 in FIG. 2A. With reference to FIG. 1 to FIG. 2D, the inertial measurement unit evaluating method 100 of the 1st embodiment is described with the assistance of the inertial measurement unit evaluating system 200 of the 2nd embodiment of the present disclosure. An inertial measurement unit evaluating method 100 is for evaluating an accuracy of an inertial measurement unit 230 included in the autonomous driving vehicle 800. The autonomous driving vehicle 800 further includes a left camera 210 and a right camera 220, and the left camera 210 and the right camera 220 both face a front direction of the autonomous driving vehicle 800, e.g., the left camera 210 and the right camera 220 may be placed on the windshield of the front portion 880 of the autonomous driving vehicle 800 to face the front direction. The inertial measurement unit evaluating method 100 includes an image capturing step 120, a vanishing line calculating step 140, an image parameter determining step 160, a unit parameter obtaining step 170 and a parameter comparing step 180. Furthermore, the autonomous driving vehicle 800 may be an autonomous driving vehicle, or a vehicle of self-driving, semi-self-driving, or assisted driving, e.g., an autonomous car, an automated guided vehicle (AGV), etc.

Figure 5A:
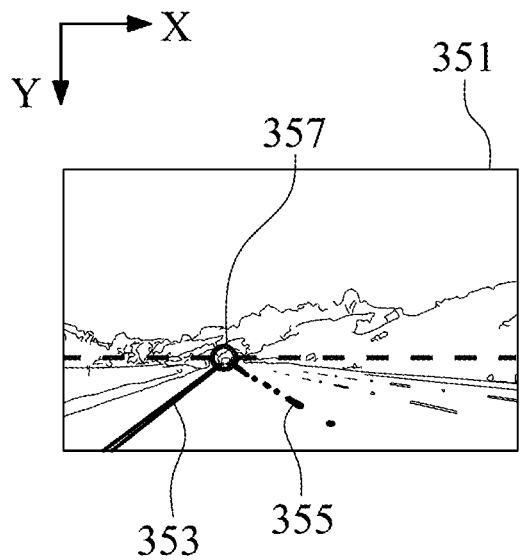
FIG. 5A and FIG. 5B are schematic views of the vanishing points of the left image and the right image, respectively, of the reference line for determining the image rollover tilt angle in the inertial measurement unit evaluating method of the 1st embodiment.
Figure 5B:
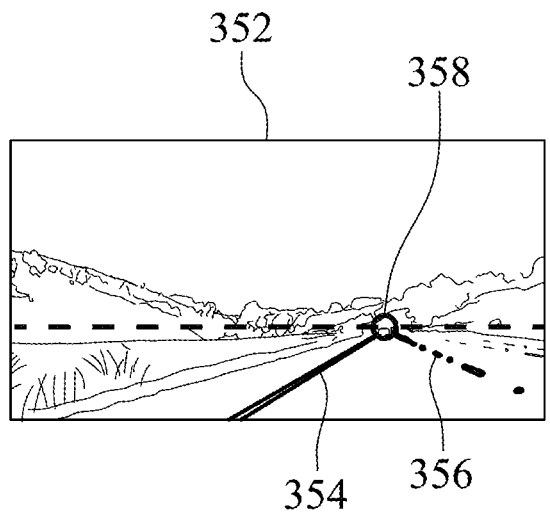
Figure 5C:
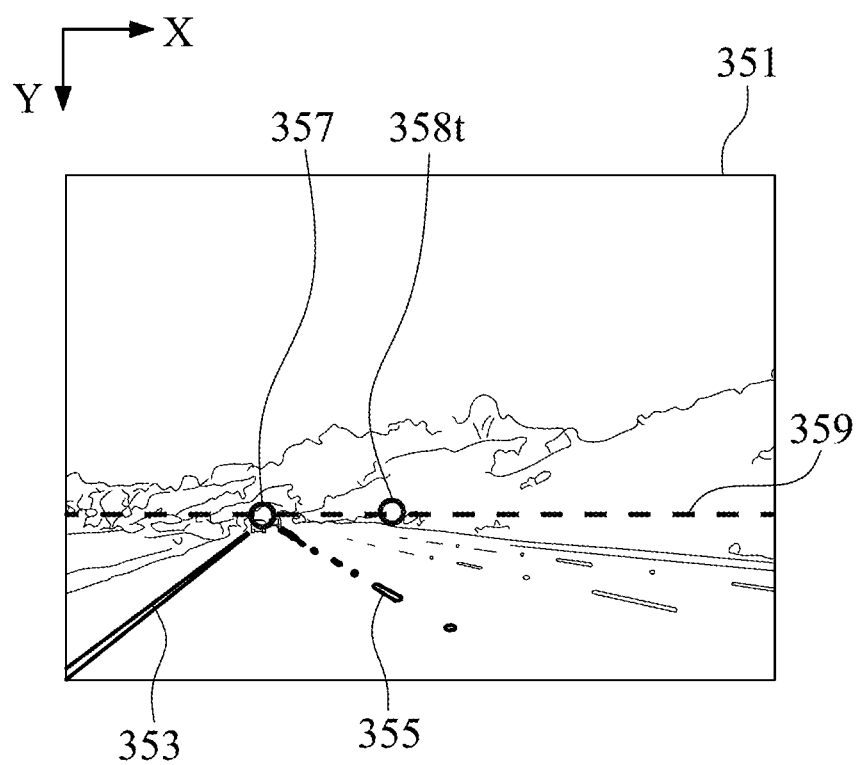
FIG. 5C is a schematic view of the reference line for determining the image rollover tilt angle in the inertial measurement unit evaluating method of the 1st embodiment.
Figure 5D:
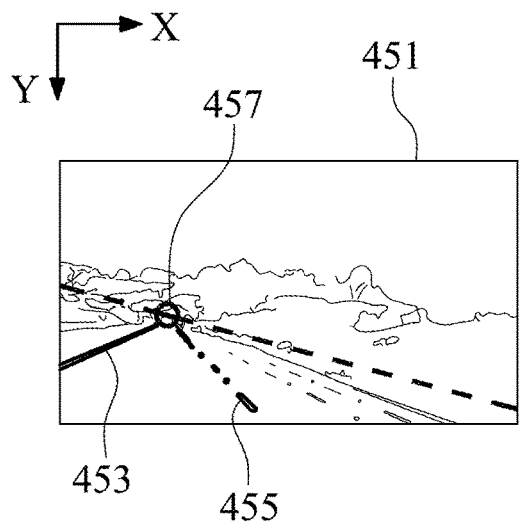
FIG. 5D and FIG. 5E are schematic views of the vanishing points of the left image and the right image, respectively, of the vanishing line for determining the image rollover tilt angle in the inertial measurement unit evaluating method of the 1st embodiment.
Figure 5E:
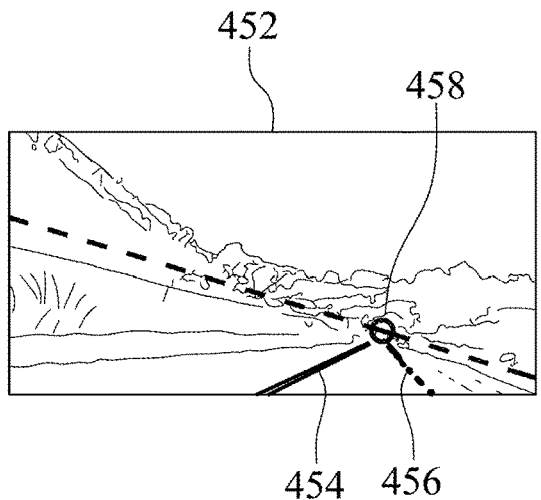
Figure 5F:
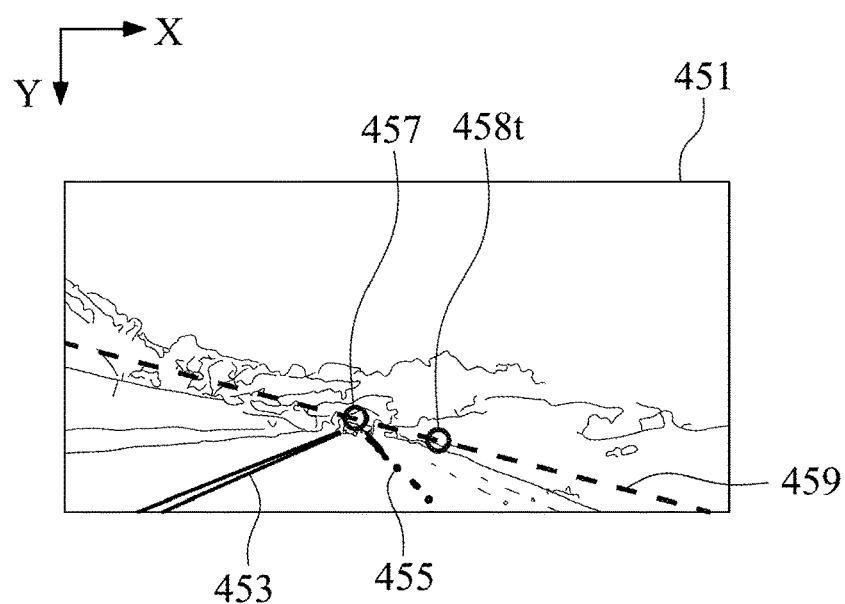
FIG. 5F is a schematic view of the vanishing line for determining the image rollover tilt angle in the inertial measurement unit evaluating method of the 1st embodiment.

FIG. 5D and FIG. 5E are schematic views of the first vanishing point 457 and the second vanishing point 458 of the left image 451 and the right image 452, respectively, of the vanishing line 459 for determining the image rollover tilt angle φ (clockwise direction or counterclockwise direction) in the inertial measurement unit evaluating method 100 of the 1st embodiment. FIG. 5F is a schematic view of the vanishing line 459 for determining the image rollover tilt angle φ in the inertial measurement unit evaluating method 100 of the 1st embodiment. With reference to FIG. 5D to FIG. 5F, the image capturing step 120 includes capturing the left image 451 and the right image 452 by the left camera 210 and the right camera 220, respectively, at a time point, and each of the left image 451 and the right image 452 may be an image frame. The left image 451 includes the first left lane line 453, the first right lane line 455 and the first vanishing point 457, and the first vanishing point 457 is an intersection of the first left lane line 453 and the first right lane line 455. The right image 452 includes the second left lane line 454, the second right lane line 456 and the second vanishing point 458, and the second vanishing point 458 is an intersection of the second left lane line 454 and the second right lane line 456. The vanishing line calculating step 140 includes calculating to generate a vanishing line equation of the vanishing line 459. The vanishing line 459 is a line connecting the first vanishing point 457 and the second vanishing point 458, or a line connecting the first vanishing point 457 and the second vanishing point 458$t$, which is the second vanishing point 458 after being transformed into the image coordinate system, as shown in FIG. 5F.

With reference to FIG. 1, the image parameter determining step 160 includes determining an image parameter set of the autonomous driving vehicle 800 according to the vanishing line equation. The unit parameter obtaining step 170 includes obtaining a unit parameter set (i.e., an inertial measurement unit parameter set) of the autonomous driving vehicle 800 from the inertial measurement unit 230. The parameter comparing step 180 includes comparing the image parameter set and the unit parameter set to generate a comparison result. Therefore, based on the increasing image processing requirements for the vehicles, the number of cameras thereon has changed from single one to the multiple ones for the applications. The inertial measurement unit evaluating method 100 of the present disclosure applying the lane recognition technology will not cause too much load on the hardware and computing system of the autonomous driving vehicle 800, so as to be easy to system integration and to effectively evaluate the accuracy of the inertial measurement unit 230.

FIG. 3A, FIG. 3B, FIG. 3C, FIG. 3D, FIG. 3E and FIG. 3F are schematic views of the images 511, 521, 531, 541, 551, 561, respectively, corresponding to the sub-steps of the image capturing step 120 in FIG. 1. With reference to FIG. 3A to FIG. 3F, in the image capturing step 120, the lane line recognizing sub-step uses the Hough transform feature detection method. First, the image 511 of the original data (YUV) is captured by the left camera 210 or the right camera 220, then the image 521 is generated from the image 511 after the grayscale conversion being performed and the image coordinate system being defined, and then the image 531 is generated from the image 521 after the edge processing being performed by Canny algorithm. Next, the region of interest (ROI) is set, such as the triangular frame 548 in the image 541, which is formed by connecting the bottom line and the two oblique lines of the image 541. The inside of the triangular frame 548 is the recognition region, the outside thereof is the non-recognition region, and the outside of the triangular frame 548, e.g., the image 551, is filled with a specific color block (e.g., a black block). Next, the Hough transform feature detection method is used to recognize the lane lines, such as the left lane line 563 and the right lane line 565 in the image 561, and then a plurality of coordinate values of the left lane line 563 and the right lane line 565 are obtained. Any two of the coordinate values of one line can be used to obtain the slope and the linear line equation of the line, and the vanishing point 567 being the intersection of the left lane line 563 and the right lane line 565 can be obtained. For example, the linear line equation of the left lane line 563 is represented as Y=a1×X+b1, the linear line equation of the right lane line 565 is represented as Y=a2×X+b2, a1, a2, b1, and b2 are coefficients, and the vanishing point 567 is represented as (K1, K2).

Furthermore, the vanishing point is an intersection point intersected by all parallel lines in the camera coordinate system of the three-dimensional space. The two lanes are parallel in the camera coordinate system of the three-dimensional space, however, the two lanes are eventually intersected as the vanishing point in the image coordinate system of the two-dimensional space, e.g., the first vanishing point 457 in FIG. 5D may have the coordinate value represented as (K1, K2). Moreover, the union of all vanishing points constitutes a vanishing line.

The vanishing line calculating step 140 may further include transforming one image coordinate system of an image coordinate system of the left image 451 and an image coordinate system of the right image 452 into the other image coordinate system thereof. A coordinate of a horizontal direction of the other image coordinate system is represented as X, a coordinate of a vertical direction of the other image coordinate system is represented as Y, the vanishing line equation is represented as Y=a×X+b, and a and b are coefficients of the vanishing line equation. Therefore, the coordinate system transformation and subsequent calculating steps are advantageous in reducing the amount of computation and accurately determining the three-axis angle (i.e., the three-axis tilt angle or the three-axis rotation angle) of the autonomous driving vehicle 800 with the dual images.

Figure 4A:
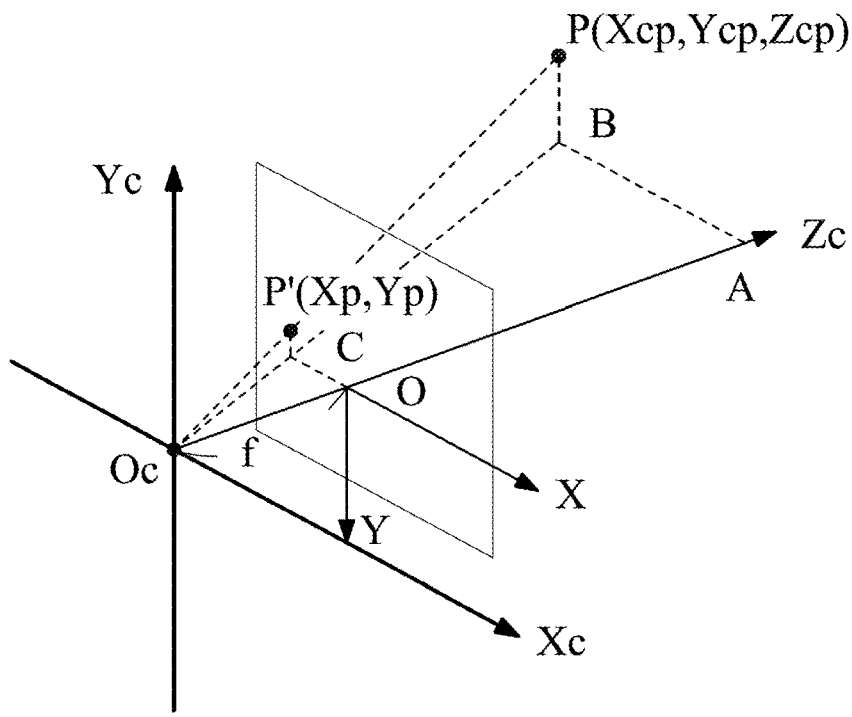
FIG. 4A and FIG. 4B are reference views of the transformations of the image coordinate systems in the vanishing line calculating step in FIG. 1.
Figure 4B:
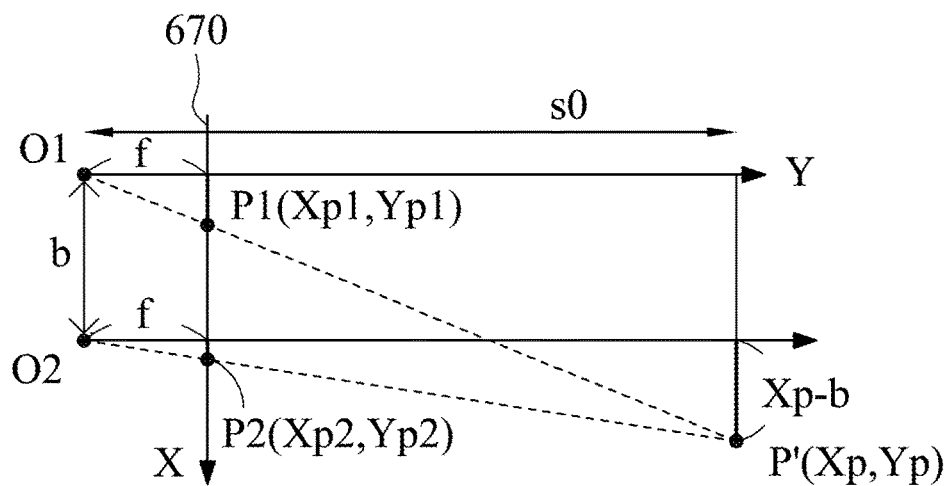

FIG. 4A and FIG. 4B are reference views of the transformations of the image coordinate systems in the vanishing line calculating step 140 in FIG. 1. With reference to FIG. 4A, furthermore, the transformation of the camera coordinate system (Xc, Yc, Zc) into the image coordinate system (X, Y) is transformed from a three-dimensional space to a two-dimensional space, which belongs to the perspective projection relationship. As shown in FIG. 4A, the camera coordinate system is the coordinate system of the directions (axes) Xc, Yc, Zc and the origin Oc, and the image coordinate system is the coordinate system of the horizontal direction X, the vertical direction Y and the origin O. In FIG. 4A, it also shows the point P to be measured, the focal length f and the vertices A, B, C, and the coordinate value of the point P to be measured in the camera coordinate system is P(Xcp, Ycp, Zcp) and transformed to the coordinate value P'(Xp, Yp) of the image point P' to be measured in the image coordinate system. In FIG. 4A, there are the trigonometric relationships ΔABOc~ΔOCOc and ΔPBOc~ΔP'COc, so there are further the line segment geometric relationships in formula (1), formula (2), formula (3) and the transformation relationship of formula (4) from the camera coordinate system to image coordinate system as the following:

$$\frac{AB}{OC} = \frac{AOc}{OOc} = \frac{PB}{P'C} = \frac{Xcp}{Xp} = \frac{Zcp}{f} = \frac{Ycp}{Yp}; \tag{1}$$

$$Xp = f \times \frac{Xcp}{Zcp}; \tag{2}$$

$$Yp = f \times \frac{Ycp}{Zcp}; \text{ and} \tag{3}$$

$$Zcp \begin{bmatrix} Xp \\ Yp \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} Xcp \\ Ycp \\ Zcp \end{bmatrix}. \tag{4}$$

With reference to FIG. 4B, which shows the schematic view of dual cameras (e.g., the left camera 210 and the right camera 220) represented in the image coordinate system. In FIG. 4B, it shows the optical centers O1 and O2 of the dual cameras, the image point P' to be measured (the coordinate value in the image coordinate system is P'(Xp, Yp)), the imaging point P1 (with the coordinate value (Xp1, Yp1)) and the imaging point P2 (with the coordinate value (Xp2, Yp2)) on the imaging surface 670 of the image sensors of the dual cameras, the focal length f, the baseline distance b of the dual cameras and the depth distance s0. In FIG. 4B, there are the line segment geometric relationship in formula (5), the coordinate value relationship of the imaging points P1, P2 in the horizontal direction X in formula (6), the coordinate value relationship of the imaging points P1 and P2 in the vertical direction Y in formula (7), and the depth distance s0 in formula (8) as the following:

$$\frac{s0}{f} = \frac{Xp}{Xp1} = \frac{(Xp-b)}{Xp2} = \frac{Yp}{Yp1} = \frac{Yp}{Yp2}; \tag{5}$$

$$Xp2 = \left(\frac{(Xp-b)}{Xp}\right) \times Xp1 = M \times Xp1; \tag{6}$$

$$Yp2 = Yp1; \text{ and} \tag{7}$$

$$\frac{s0}{f} = f \times \frac{b}{(Xp1 - Xp2)}. \tag{8}$$

FIG. 5A and FIG. 5B are schematic views of the first vanishing point 357 and the second vanishing point 358 of the left image 351 and the right image 352, respectively, of the reference line 359 for determining the image rollover tilt angle ϕ in the inertial measurement unit evaluating method

100 of the 1st embodiment. FIG. 5C is a schematic view of the reference line 359 for determining the image rollover tilt angle ϕ in the inertial measurement unit evaluating method 100 of the 1st embodiment. With reference to FIG. 5A to FIG. 5C, the inertial measurement unit evaluating method 100 may further include a reference line defining step 110, when the autonomous driving vehicle 800 is in a non-tilted state (may be determined by the inertial measurement unit 230) at another time point, the another time point is earlier than the time point, and the left image 351 and the right image 352 are captured by the left camera 210 and the right camera 220, respectively, at the another time point. The left image 351 includes the first left lane line 353, the first right lane line 355 and the first vanishing point 357, and the right image 352 includes the second left lane line 354, the second right lane line 356 and the second vanishing point 358. Next, the second vanishing point 358 in the image coordinate system of the right image 352 is transformed into the second vanishing point 358*t* in the image coordinate system of the left image 351 (as shown in FIG. 5C). The first vanishing point 357 and the second vanishing point 358*t* in the left image 351 are connected to form a vanishing line having a vanishing line equation, which is defined as the reference line 359 having the reference line equation. In the 1st embodiment, the reference line equation is Y=K5, and K5 is a constant of the reference line equation. Therefore, the reference line in the non-tilted state and the subsequent calculating steps are advantageous in reducing the amount of computation and accurately determining the three-axis angle of the autonomous driving vehicle 800 with the dual images.

Furthermore, in the camera coordinate system, when the camera is in a horizontal state and not tilted, the slope is equal to 0. Because the slope is equal to 0, only the single coordinate value of the vanishing point can be used to obtain the vanishing line equation, which is represented as Y=K0 (or shown in another constant symbol) and can be used as the original linear line equation of the three-axis of the vehicle body in the camera coordinate system. On the contrary, when the camera is tilted (the slope is not equal to 0), the intersection of the two lane lines in the image coordinate system of the two-dimensional space is the vanishing point, the coordinate value of the vanishing point can be obtained, but the vanishing line equation cannot be obtained, and a coordinate value of another point on the vanishing line is needed for obtaining the vanishing line equation.

Figure 5G:
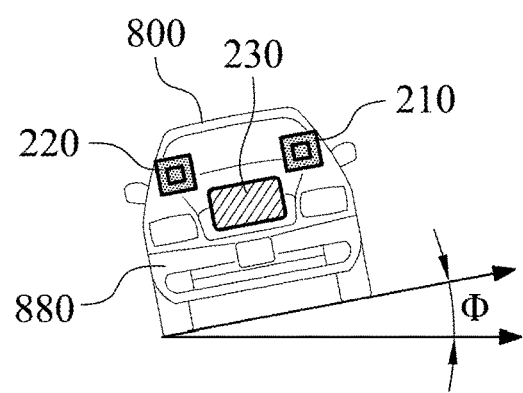
FIG. 5G is a schematic view of the image rollover tilt angle in the inertial measurement unit evaluating method of the 1 st embodiment.

FIG. 5G is a schematic view of the image rollover tilt angle ϕ in the inertial measurement unit evaluating method 100 of the 1st embodiment. With reference to FIG. 1 and FIG. 5C to FIG. 5G, in the image capturing step 120 after the reference line defining step 110, the left image 451 and the right image 452 are captured by the left camera 210 and the right camera 220, respectively, at the time point.

In the vanishing line calculating step 140, the second vanishing point 458 in the image coordinate system of the right image 452 is transformed into the second vanishing point 458*t* in the image coordinate system of the left image 451 (as shown in FIG. 5F). The first vanishing point 457 and the second vanishing point 458*t* in the left image 451 are connected to form the vanishing line 459 having a vanishing line equation Y=a5×X+b5, and a5 and b5 are constants of the vanishing line equation.

In the image parameter determining step 160, the image parameter set may include the image rollover tilt angle ϕ, as shown in FIG. 5G. The image rollover tilt angle ϕ is an angle between the vanishing line 459 in FIG. 5F and the reference line 359 in FIG. 5C. The angle that can be obtained from the vanishing line equation Y=a5×X+b5 and the reference line equation Y=K5 is the image rollover tilt angle ϕ, which is the angle at which the autonomous driving vehicle 800 tilts clockwise or counterclockwise relative to the normal direction Z. In the unit parameter obtaining step 170, the unit parameter set includes a unit rollover tilt angle, which corresponds to the image rollover tilt angle ϕ. The parameter comparing step 180 further include comparing the image rollover tilt angle ϕ and the unit rollover tilt angle. Therefore, the image rollover tilt angle ϕ can be accurately calculated for comparison with the unit rollover tilt angle.

Figure 6E:
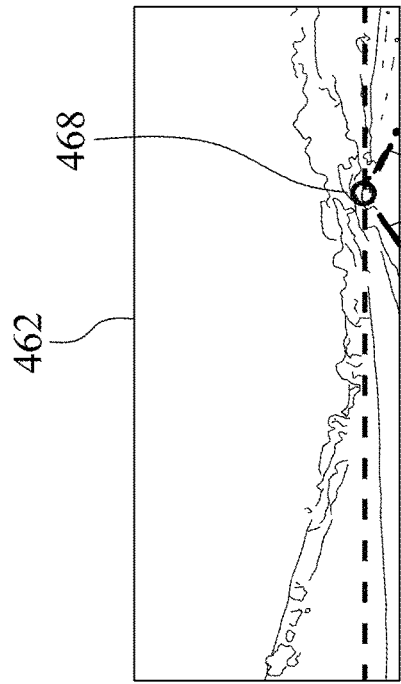
FIG. 6D and FIG. 6E are schematic views of the vanishing points of the left image and the right image, respectively, of the vanishing line for determining the image up-down tilt angle in the inertial measurement unit evaluating method of the 1st embodiment.
Figure 6D:
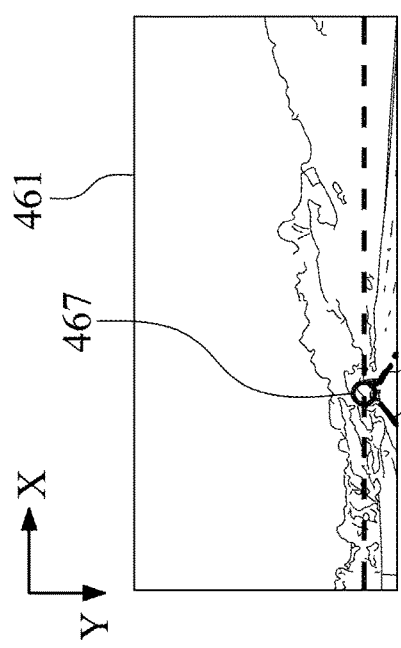
Figure 6F:
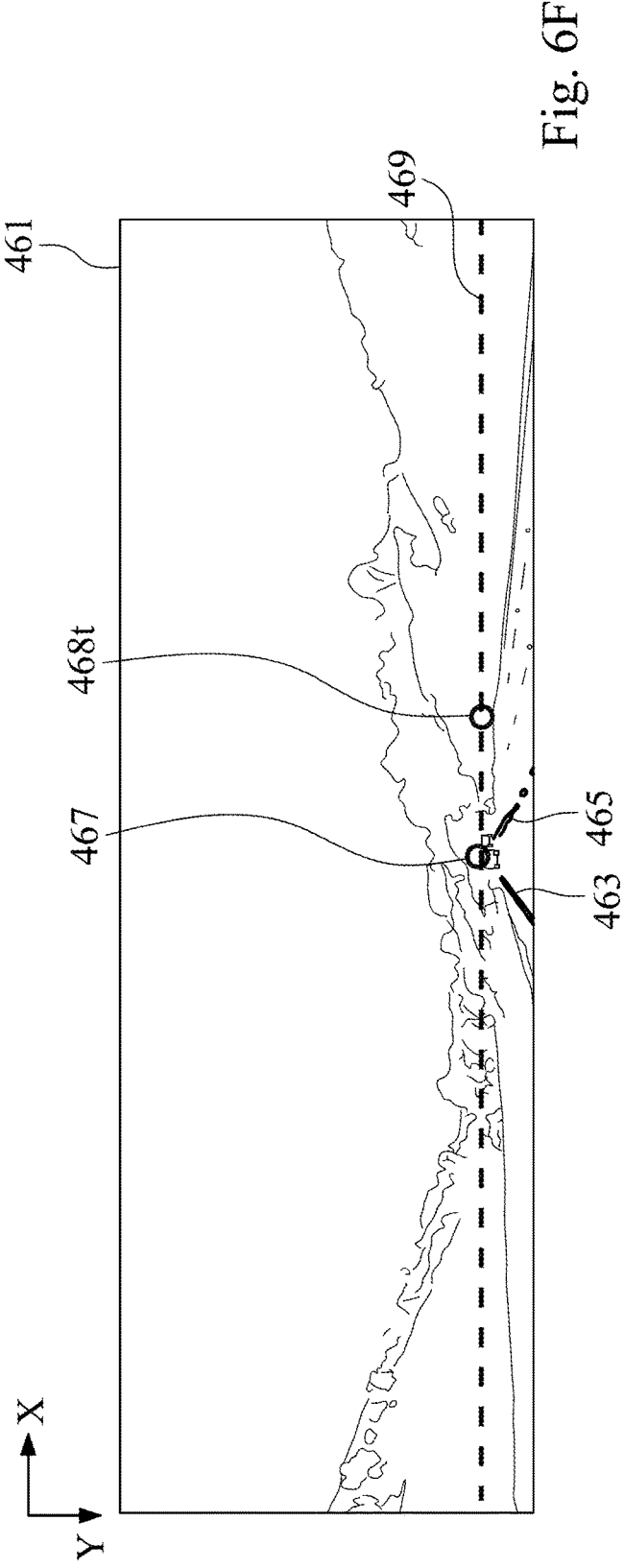
FIG. 6F is a schematic view of the vanishing line for determining the image up-down tilt angle in the inertial measurement unit evaluating method of the 1st embodiment.
Figure 6G:
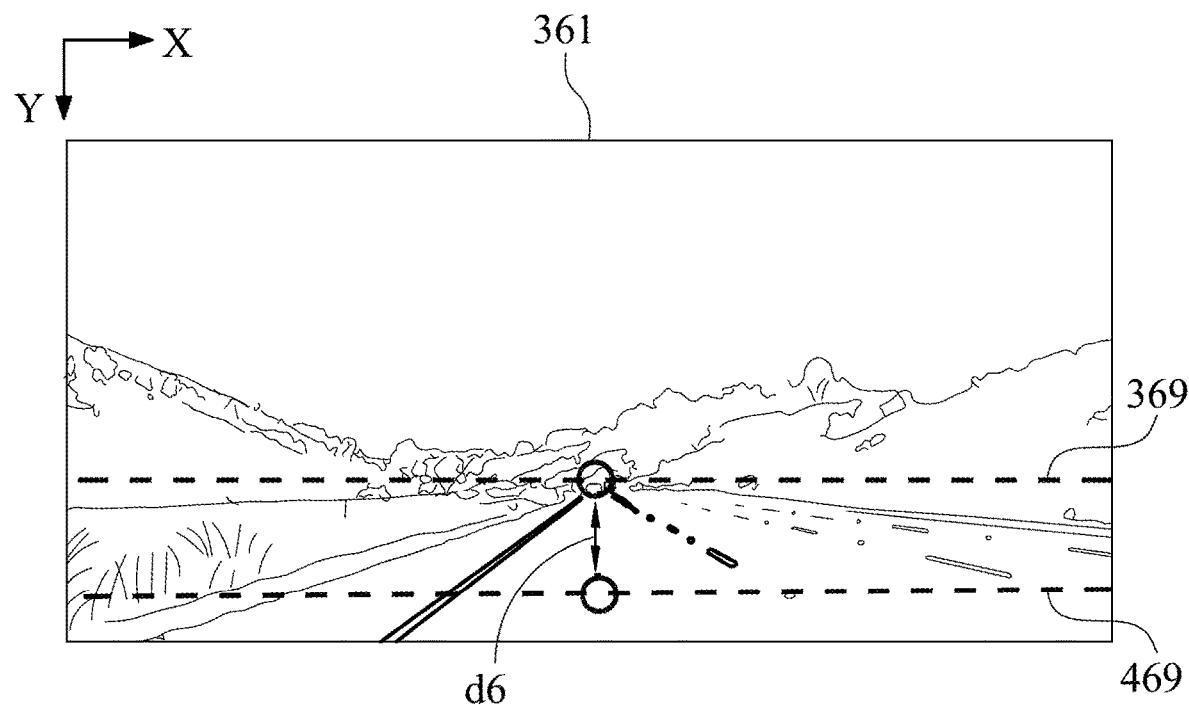
FIG. 6G is a schematic view of the parameters for determining the image up-down tilt angle in the inertial measurement unit evaluating method of the 1st embodiment.
Figure 6H:
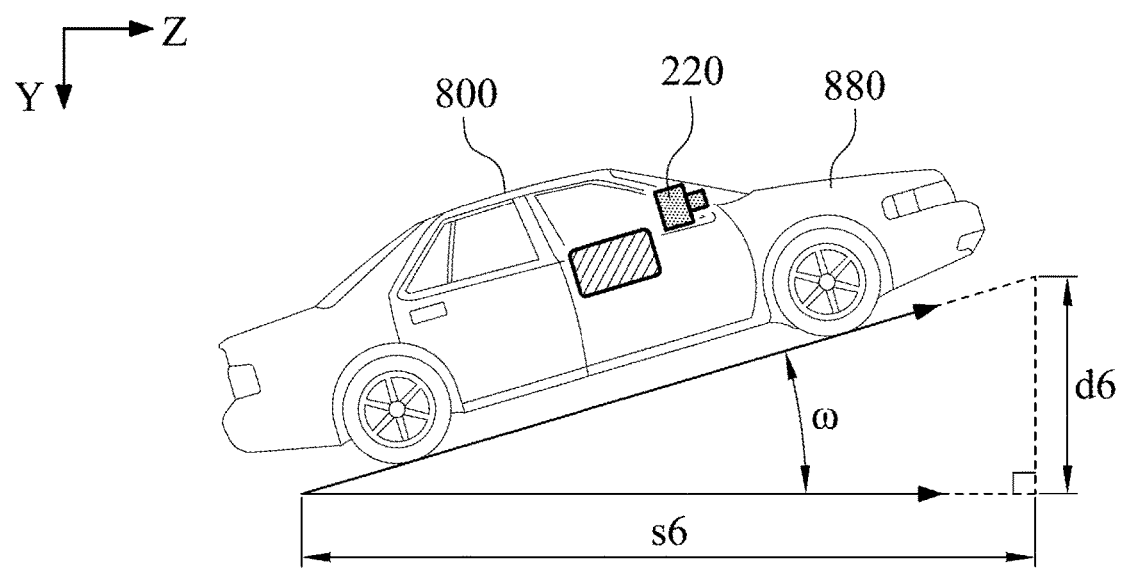
FIG. 6H is a schematic view of the image up-down tilt angle in the inertial measurement unit evaluating method of the 1st embodiment.

FIG. 6A and FIG. 6B are schematic views of the first vanishing point 367 and the second vanishing point 368 of the left image 361 and the right image 362, respectively, of the reference line 369 for determining the image up-down tilt angle ω in the inertial measurement unit evaluating method 100 of the 1st embodiment. FIG. 6C is a schematic view of the reference line 369 for determining the image up-down tilt angle ω in the inertial measurement unit evaluating method 100 of the 1st embodiment. FIG. 6D and FIG. 6E are schematic views of the first vanishing point 467 and the second vanishing point 468 of the left image 461 and the right image 462, respectively, of the vanishing line 469 for determining the image up-down tilt angle ω in the inertial measurement unit evaluating method 100 of the 1st embodiment. FIG. 6F is a schematic view of the vanishing line 469 for determining the image up-down tilt angle ω in the inertial measurement unit evaluating method 100 of the 1st embodiment. FIG. 6G is a schematic view of the parameters for determining the image up-down tilt angle ω in the inertial measurement unit evaluating method 100 of the 1st embodiment. FIG. 6H is a schematic view of the image up-down tilt angle ω in the inertial measurement unit evaluating method 100 of the 1st embodiment. With reference to FIG. 1 and FIG. 6A to FIG. 6H, in the reference line defining step 110, when the autonomous driving vehicle 800 is in the non-tilted state, the left image 361 and the right image 362 are captured by the left camera 210 and the right camera 220, respectively. The left image 361 includes the first left lane line 363, the first right lane line 365 and the first vanishing point 367, and the right image 362 includes the second left lane line 364, the second right lane line 366 and the second vanishing point 368. Next, the second vanishing point 368 in the image coordinate system of the right image 362 is transformed into the second vanishing point 368*t* in the image coordinate system of the left image 361 (as shown in FIG. 6C). The first vanishing point 367 and the second vanishing point 368*t* in the left image 361 are connected to form the reference line 369 having a reference line equation Y=K62, and K62 is a constant of the reference line equation.

In the image capturing step 120 after the reference line defining step 110, the left image 461 and the right image 462 are captured by the left camera 210 and the right camera 220, respectively. The left image 461 includes the first left lane line 463, the first right lane line 465 and the first vanishing point 467, and the right image 462 includes the second left lane line 464, the second right lane line 466 and the second vanishing point 368. In the vanishing line calculating step 140, the second vanishing point 468 in the image coordinate system of the right image 462 is transformed into the second vanishing point 468*t* in the image coordinate system of the left image 461 (as shown in FIG. 6F). The first vanishing point 467 and the second vanishing point 468*t* in the left image 461 are connected to form the vanishing line 469 having a vanishing line equation Y=K63, and K63 is a constant of the vanishing line equation.

The vanishing line calculating step 140 may further include calculating to generate a vanishing distance s6 (as shown in FIG. 6H) parallel to the normal direction Z between the vanishing line 469 and one of the left camera 210 and the right camera 220, the vanishing distance s6 is a distance from the one of the left camera 210 and the right camera 220 to the first vanishing point 467, and the horizontal direction X, the vertical direction Y and the normal direction Z are perpendicular to each other.

In the image parameter determining step 160, the image parameter set may include the image up-down tilt angle ω (as shown in FIG. 6H), which is obtained according to a difference d6 in the vertical direction Y between the vanishing line 469 and the reference line 369, and the vanishing distance s6, that is, d6=K63−K62, and via tan(ω)=d6/s6, the image up-down tilt angle ω can be obtained. The image up-down tilt angle ω is the upward or downward angle of the body of the autonomous driving vehicle 800. In the unit parameter obtaining step 170, the unit parameter set includes a unit up-down tilt angle, which corresponds to the image up-down tilt angle ω. The parameter comparing step 180 further includes comparing the image up-down tilt angle ω and the unit up-down tilt angle. Therefore, the image up-down tilt angle ω can be accurately calculated for comparison with the unit up-down tilt angle.

Figures 7D, 7E:
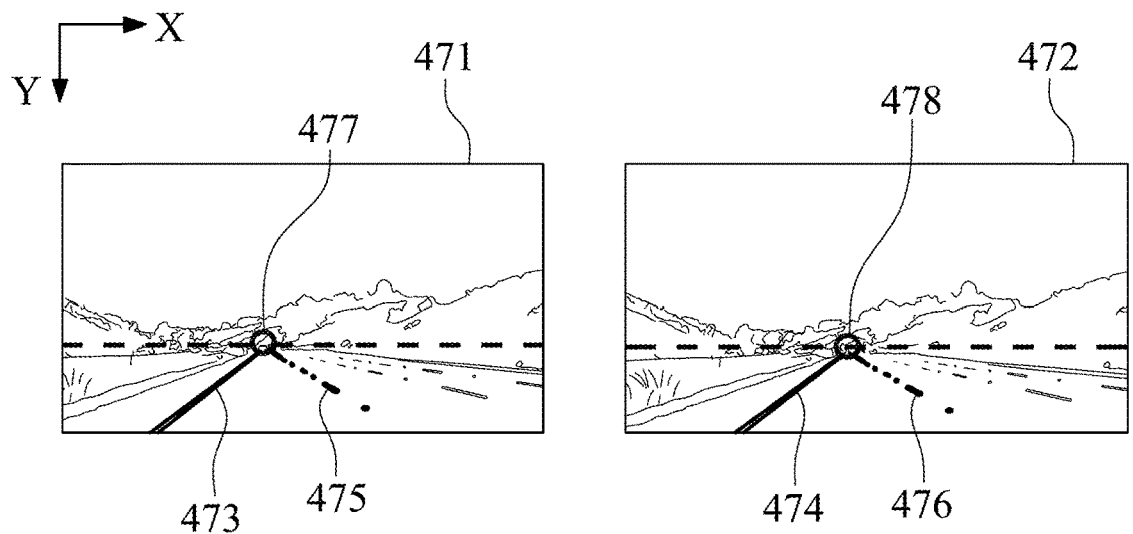
FIG. 7D and FIG. 7E are schematic views of the vanishing points of the left image and the right image, respectively, for determining the image left-right tilt angle in the inertial measurement unit evaluating method of the 1st embodiment.
Figure 7F:
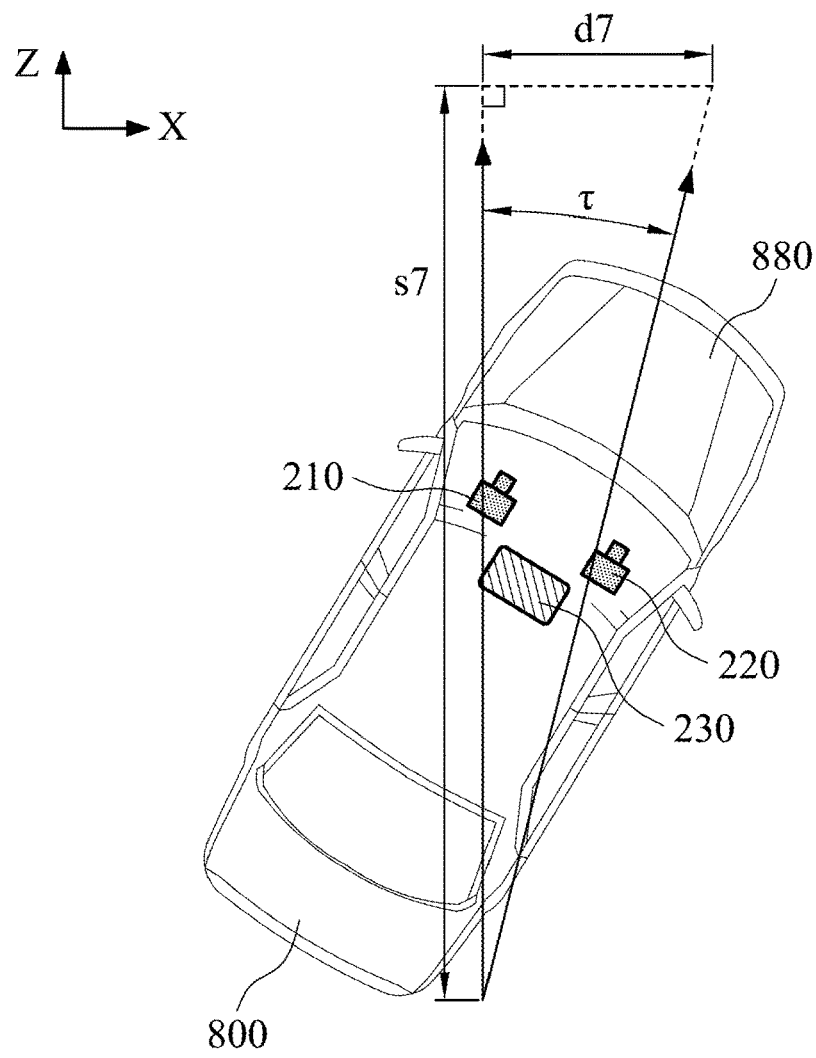
FIG. 7F is a schematic view of the image left-right tilt angle in the inertial measurement unit evaluating method of the 1st embodiment.

FIG. 7A and FIG. 7B are schematic views of the first vanishing point 377 and the second vanishing point 378 of the left image 371 and the right image 372, respectively, of the reference line 379 for determining the image left-right tilt angle T in the inertial measurement unit evaluating method 100 of the 1st embodiment. FIG. 7C is a schematic view of the reference line 379 for determining the image left-right tilt angle τ in the inertial measurement unit evaluating method 100 of the 1st embodiment. FIG. 7D and FIG. 7E are schematic views of the first vanishing point 477 and the second vanishing point 478 of the left image 471 and the right image 472, respectively, for determining the image left-right tilt angle τ in the inertial measurement unit evaluating method 100 of the 1st embodiment. FIG. 7F is a schematic view of the image left-right tilt angle τ in the inertial measurement unit evaluating method 100 of the 1st embodiment. With reference to FIG. 1 and FIG. 7A to FIG. 7F, in the reference line defining step 110, when the autonomous driving vehicle 800 is in the non-tilted state, the left image 371 and the right image 372 are captured by the left camera 210 and the right camera 220, respectively. The left image 371 includes the first left lane line 373, the first right lane line 375 and the first vanishing point 377, and the right image 372 includes the second left lane line 374, the second right lane line 376 and the second vanishing point 378. Next, the second vanishing point 378 in the image coordinate system of the right image 372 is transformed into the second vanishing point 378t in the image coordinate system of the left image 371 (as shown in FIG. 7C). The coordinate value of the first vanishing point 377 in the left image 371 is (Xp1, Yp1), and the coordinate value of the transformed second vanishing point 378t is (Xp2, Yp2). The first vanishing point 377 and the second vanishing point 378t in the left image 371 are connected to form the reference line 379 having a reference line equation Y=K7, and K7 is a constant of the reference line equation. In practice, it should be noted that the reference line in one of FIG. 5C, FIG. 6C and FIG. 7C can be defined as a reference line in another one of FIG. 5C, FIG. 6C and FIG. 7C, that is, the reference lines with the reference line equations of the one and the another one of FIG. 5C, FIG. 6C and FIG. 7C are the same.

In the image capturing step 120 after the reference line defining step 110, the left image 471 and the right image 472 are captured by the left camera 210 and the right camera 220, respectively. The left image 471 includes the first left lane line 473, the first right lane line 475 and the first vanishing point 477, and the right image 472 includes the second left lane line 474, the second right lane line 476 and the second vanishing point 378. In the vanishing line calculating step 140, the second vanishing point 478 in the image coordinate system of the right image 472 is transformed into the second vanishing point (not shown in drawings) in the image coordinate system of the left image 471. The coordinate value of the first vanishing point 477 in the left image 471 is (Xq1, Yq1), and the coordinate value of the transformed second vanishing point in the left image 471 is (Xq2, Yq2). The vanishing line calculating step 140 further includes calculating to generate a vanishing distance s7 parallel to the normal direction Z between the vanishing line and one of the left camera 210 and the right camera 220, as shown in FIG. 7F.

In the image parameter determining step 160, the image parameter set may include the image left-right tilt angle τ, as shown in FIG. 7F. The image left-right tilt angle τ is obtained according to an absolute value d7 of a difference in the horizontal direction X between the transformed second vanishing point in the left image 471 and the transformed second vanishing point 378t, which is for defining the reference line 379, in the left image 371, that is, d7=|Xp2−Xq2|, and via tan(τ)=d7/s7, the image left-right tilt angle τ can be obtained. The image left-right tilt angle τ is the left or right tilt angle of the body of the autonomous driving vehicle 800. In the unit parameter obtaining step 170, the unit parameter set includes a unit left-right tilt angle, which corresponds to the image left-right tilt angle τ. The parameter comparing step 180 further includes comparing the image left-right tilt angle τ and the unit left-right tilt angle. Therefore, the image left-right tilt angle τ can be accurately calculated for comparison with the unit left-right tilt angle. In another embodiment of the present disclosure (not shown in drawings), an image left-right tilt angle may be obtained according to an absolute value of a difference in the horizontal direction between the first vanishing point, which is for defining the vanishing line, and another first vanishing point, which is for defining the reference line.

In practice, at least two of the three-axis angles (i.e., the image rollover angle φ, the image up-down tilt angle ω and the image left-right tilt angle τ) at a time point of the autonomous driving vehicle 800 calculated by the inertial measurement unit evaluating method 100 may be not zero. For example, the image rollover tilt angle φ towards the clockwise direction and the image up-down tilt angle ω towards the up direction may both exist at a time point, or the image up-down tilt angle ω towards the up direction and the image left-right tilt angle τ towards the left direction may both exist at a time point, or the image rollover tilt angle φ towards the counterclockwise direction, the image up-down tilt angle ω towards the down direction and the image left-right tilt angle τ towards the right direction may all exist at a time point, and it is not limited thereto. Furthermore, when the vanishing line equation Y=a5×X+b5 related to the image rollover tilt angle φ has been determined, the image rollover tilt angle D can be determined, and the image up-down tilt angle ω and the image left-right tilt angle τ can further be obtained based on the vanishing line equation Y=a5×X+b5.

With reference to FIG. 1, the inertial measurement unit evaluating method 100 may further include a calibration requesting step 190, which includes requesting to perform a calibration of the inertial measurement unit 230 when the comparison result satisfies a threshold condition, e.g., the signals for requesting the calibration of the inertial measurement unit 230 is generated and transmitted. Therefore, the inertial measurement unit evaluating method 100 is advantageous in evaluating whether to further perform a computationally intensive calibration (e.g., a Kalman filter algorithm) for the inertial measurement unit 230. When the comparison result does not satisfy the threshold condition, that is, when the unit parameter set measured by the inertial measurement unit 230 is evaluated within an acceptable range of the accuracy by the inertial measurement unit evaluating method 100, the computationally intensive calibration can be not needed, and the calibration accuracy of the inertial measurement unit 230 can be simultaneously ensured.

With reference to FIG. 2A to FIG. 2D, the inertial measurement unit evaluating system 200 is disposed on the autonomous driving vehicle 800 and includes the inertial measurement unit 230, the left camera 210, the right camera 220, a storage medium 280 and a processor 290.

The left camera 210 faces a front direction of the autonomous driving vehicle 800, and the right camera 220 faces the front direction. The storage medium 280 is configured to provide an inertial measurement unit evaluating program 282. The processor 290 is communicatively coupled to the inertial measurement unit 230, the left camera 210, the right camera 220 and the storage medium 280. Based on the inertial measurement unit evaluating program 282, the processor 290 is configured to capture the left image 451 and the right image 452 by the left camera 210 and the right camera 220, respectively, at a time point, the left image 451 includes the first left lane line 453, the first right lane line 455 and the first vanishing point 457, the first vanishing point 457 is the intersection of the first left lane line 453 and the first right lane line 455, the right image 452 includes the second left lane line 454, the second right lane line 456 and the second vanishing point 458, and the second vanishing point 458 is the intersection of the second left lane line 454 and the second right lane line 456. Based on the inertial measurement unit evaluating program 282, the processor 290 is further configured to: calculate to generate the vanishing line 459, which is a line connecting the first vanishing point 457 and the second vanishing point 458 or the second vanishing point 458t transformed into the image coordinate system; determine the image parameter set of the autonomous driving vehicle 800 according to the vanishing line 459; obtain the unit parameter set of the autonomous driving vehicle 800 from the inertial measurement unit 230; and compare the image parameter set and the unit parameter set to generate the comparison result. Therefore, the inertial measurement unit evaluating system 200 is advantageous in evaluating whether to further perform the computationally intensive calibration for the inertial measurement unit 230.

With reference to FIG. 2B and FIG. 2D, the left camera 210 and the right camera 220 may be disposed symmetrically to a (virtual) longitudinal center plane of the autonomous driving vehicle 800. Therefore, it is beneficial to reduce the calculation amount required by the inertial measurement unit evaluating program 282. Furthermore, the left camera and the right camera according to the present disclosure can be dual cameras on the same device, or each can be an independent single camera device.

Regarding other details of the inertial measurement unit evaluating system 200 of the 2nd embodiment, the contents of the inertial measurement unit evaluating method 100 of the 1st embodiment can be referred, and the details are not described again herein.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An inertial measurement unit evaluating method, for evaluating an accuracy of an inertial measurement unit comprised in an autonomous driving vehicle, the autonomous driving vehicle further comprising a left camera and a right camera, the left camera and the right camera both facing a front direction of the autonomous driving vehicle, and the inertial measurement unit evaluating method comprising:
    an image capturing step comprising capturing a left image and a right image by the left camera and the right camera, respectively, at a time point, wherein the left image comprises a first left lane line, a first right lane line and a first vanishing point, the first vanishing point is an intersection of the first left lane line and the first right lane line, the right image comprises a second left lane line, a second right lane line and a second vanishing point, and the second vanishing point is an intersection of the second left lane line and the second right lane line;
    a vanishing line calculating step comprising calculating to generate a vanishing line equation of a vanishing line, which is a line connecting the first vanishing point and the second vanishing point;
    an image parameter determining step comprising determining an image parameter set of the autonomous driving vehicle according to the vanishing line equation;
    a unit parameter obtaining step comprising obtaining a unit parameter set of the autonomous driving vehicle from the inertial measurement unit; and
    a parameter comparing step comprising comparing the image parameter set and the unit parameter set to generate a comparison result.

2. The inertial measurement unit evaluating method of claim 1, wherein the vanishing line calculating step further comprising transforming one image coordinate system of an image coordinate system of the left image and an image coordinate system of the right image into the other image coordinate system thereof, a coordinate of a horizontal direction of the other image coordinate system is represented as X, a coordinate of a vertical direction of the other image coordinate system is represented as Y, the vanishing line equation is represented as $Y = a \times X + b$, and a and b are coefficients of the vanishing line equation.

3. The inertial measurement unit evaluating method of claim 2, further comprising:
    a reference line defining step, wherein when the autonomous driving vehicle is in a non-tilted state at another time point, the another time point is earlier than the time point, another left image and another right image are captured by the left camera and the right camera, respectively, at the another time point, another vanishing line equation of another vanishing line is generated according to the another left image and the another right image, the another vanishing line equation of the another vanishing line is defined as a reference line equation of a reference line, the reference line equation is represented as Y=K0, and K0 is a constant of the reference line equation.

4. The inertial measurement unit evaluating method of claim 3, wherein in the image parameter determining step, the image parameter set comprises an image rollover tilt angle, which is an angle between the vanishing line and the reference line;
wherein in the unit parameter obtaining step, the unit parameter set comprises a unit rollover tilt angle, which corresponds to the image rollover tilt angle;
wherein the parameter comparing step further comprises comparing the image rollover tilt angle and the unit rollover tilt angle.

5. The inertial measurement unit evaluating method of claim 3, wherein the vanishing line calculating step further comprises calculating to generate a vanishing distance parallel to a normal direction between the vanishing line and one of the left camera and the right camera, and the horizontal direction, the vertical direction and the normal direction are perpendicular to each other;
wherein in the image parameter determining step, the image parameter set comprises an image up-down tilt angle, which is obtained according to a difference in the vertical direction between the vanishing line and the reference line, and the vanishing distance;
wherein in the unit parameter obtaining step, the unit parameter set comprises a unit up-down tilt angle, which corresponds to the image up-down tilt angle;
wherein the parameter comparing step further comprises comparing the image up-down tilt angle and the unit up-down tilt angle.

6. The inertial measurement unit evaluating method of claim 3, wherein the vanishing line calculating step further comprises calculating to generate a vanishing distance parallel to a normal direction between the vanishing line and one of the left camera and the right camera, and the horizontal direction, the vertical direction and the normal direction are perpendicular to each other;
wherein in the image parameter determining step, the image parameter set comprises an image left-right tilt angle, and the image left-right tilt angle is obtained according to an absolute value of a difference in the horizontal direction between the first vanishing point and another first vanishing point, which is for defining the reference line, or obtained according to an absolute value of a difference in the horizontal direction between the second vanishing point and another second vanishing point, which is for defining the reference line;
wherein in the unit parameter obtaining step, the unit parameter set comprises a unit left-right tilt angle, which corresponds to the image left-right tilt angle;
wherein the parameter comparing step further comprises comparing the image left-right tilt angle and the unit left-right tilt angle.

7. The inertial measurement unit evaluating method of claim 1, further comprising:
a calibration requesting step comprising requesting to perform a calibration of the inertial measurement unit when the comparison result satisfies a threshold condition.

8. An inertial measurement unit evaluating system, disposed on an autonomous driving vehicle and comprising:
an inertial measurement unit;
a left camera facing a front direction of the autonomous driving vehicle;
a right camera facing the front direction;
a storage medium configured to provide an inertial measurement unit evaluating program; and
a processor communicatively coupled to the inertial measurement unit, the left camera, the right camera and the storage medium;
wherein based on the inertial measurement unit evaluating program, the processor is configured to:
capture a left image and a right image by the left camera and the right camera, respectively, at a time point, wherein the left image comprises a first left lane line, a first right lane line and a first vanishing point, the first vanishing point is an intersection of the first left lane line and the first right lane line, the right image comprises a second left lane line, a second right lane line and a second vanishing point, and the second vanishing point is an intersection of the second left lane line and the second right lane line;
calculate to generate a vanishing line, which is a line connecting the first vanishing point and the second vanishing point;
determine an image parameter set of the autonomous driving vehicle according to the vanishing line;
obtain a unit parameter set of the autonomous driving vehicle from the inertial measurement unit; and
compare the image parameter set and the unit parameter set to generate a comparison result.

9. The inertial measurement unit evaluating system of claim 8, wherein the left camera and the right camera are disposed symmetrically to a longitudinal center plane of the autonomous driving vehicle.

10. The inertial measurement unit evaluating system of claim 8, wherein based on the inertial measurement unit evaluating program, the processor is further configured to:
request to perform a calibration of the inertial measurement unit when the comparison result satisfies a threshold condition.

* * * * *